United States Patent [19]

Yang

[11] Patent Number: 5,410,790
[45] Date of Patent: May 2, 1995

[54] MACHINE TOOL ADJUSTABLE HEAD

[76] Inventor: Tai-Her Yang, 5-1 Taipin St., Si-Hu Town, Dzan-Hwa, Taiwan, Prov. of China

[21] Appl. No.: 155,225

[22] Filed: Nov. 22, 1993

[51] Int. Cl.$^6$ .............. B23Q 3/04; B23C 1/12
[52] U.S. Cl. ................... 29/40; 409/201; 409/211; 409/216
[58] Field of Search ............ 29/40, 39; 409/201, 409/211, 235, 202, 212, 215, 216

[56] References Cited

U.S. PATENT DOCUMENTS

| | | | |
|---|---|---|---|
| 3,232,171 | 2/1966 | Hengehold | 409/211 |
| 3,712,175 | 1/1973 | Müller et al. | 409/211 X |
| 3,958,491 | 5/1976 | Habib | 409/235 |
| 4,187,601 | 7/1980 | Aldrin | 29/560 |
| 4,819,311 | 4/1989 | Hashimoto et al. | 29/40 |
| 5,002,443 | 3/1991 | Yang | 409/216 |
| 5,127,779 | 7/1992 | Yang | 409/201 |

FOREIGN PATENT DOCUMENTS

| | | | |
|---|---|---|---|
| 694697 | 7/1953 | United Kingdom | 409/211 |
| 1379516 | 1/1975 | United Kingdom | 409/211 |

*Primary Examiner*—William Briggs
*Attorney, Agent, or Firm*—Bacon & Thomas

[57] ABSTRACT

A machine tool with a work supporting table is disclosed having a main shaft rail body with vertically extending sliding rails located in a vertical plane extending obliquely to a front face. A sliding machine seat is slidably mounted on the vertically extending sliding rails and has a first mounting surface extending parallel to the vertical plane of the sliding rails. A second machine seat having a second mounting surface located in a plane extending obliquely to the vertical plane of the sliding rails is rotatably attached to the first mounting surface. A main shaft machine seat is attached to the second machine seat.

6 Claims, 4 Drawing Sheets

MACHINE TOOL ADJUSTABLE HEAD

SUMMARY OF THE INVENTION

The main shaft rail body of the machine tool is one of the structures of the main body of machine tool, there is vertical upward and downward guide rail to be installed in front of or on the side of the rail body allowing the main body of the machine tool to move upwards or downwards generally, the way of the design and application of the installing of conventional guide rail of the main body of machine tool includes usually:

1. It is in front of the rail body allowing to install the vertical table of the main shaft;
2. It is in front of the rail body allowing to install the vertical and horizontal bi-directional table of the main shaft;
3. It is on the left or right side of the rail body allowing to install horizontal table of the main shaft;
4. it is installed on the left or right side allowing to install vertical and horizontal bi-directional table of the main shaft.

The present rail body of the main shaft providing oblique upward and downward guide rail and the application structure is chiefly to install oblique upward and downward guide rail on one side (or two sides) of the rail body of the machine tool to provide an innovative structure for adoption, it is also able to provide further the combination of the upward and downward sliding and driving on the guide rail allowing rotary angle shift regulation and fixed middle rail body of the main shaft as well as to install the main shaft set allowing rotary angle shift and to be fixed for the purpose of mechanical or manual regulation of the driving of the orientation of the main shaft.

BRIEF DESCRIPTION OF THE DRAWINGS

FIG. 1—1 is the front schematic view of the structure of FIG. 1.

FIG. 3-1 is the front view of the structure of FIG. 3.

FIG. 3-2 is the schematic view of the main shaft of machine table in the structure of FIG. 33 to be replaced by that of multiple main shafts rotary tower.

DETAILED DESCRIPTION OF THE INVENTION

Figure 1:
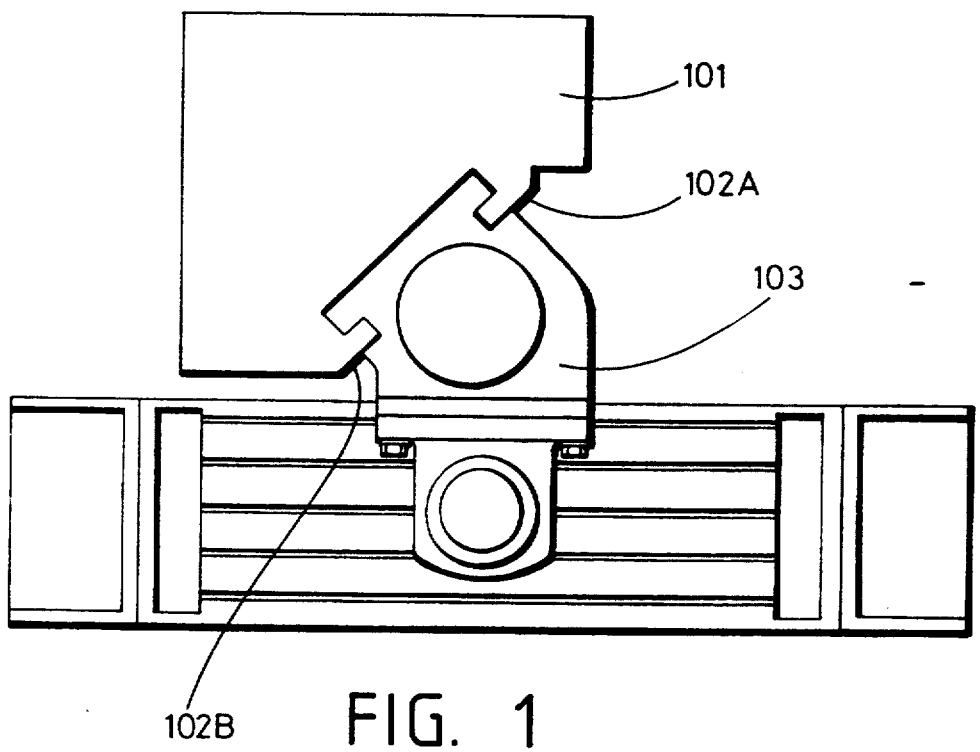
FIG. 1 is the bird's view of the main shaft rail body of the main tool in the present invention providing obliquely installed upward and downward guide rail and the application structure.
Figure 1:
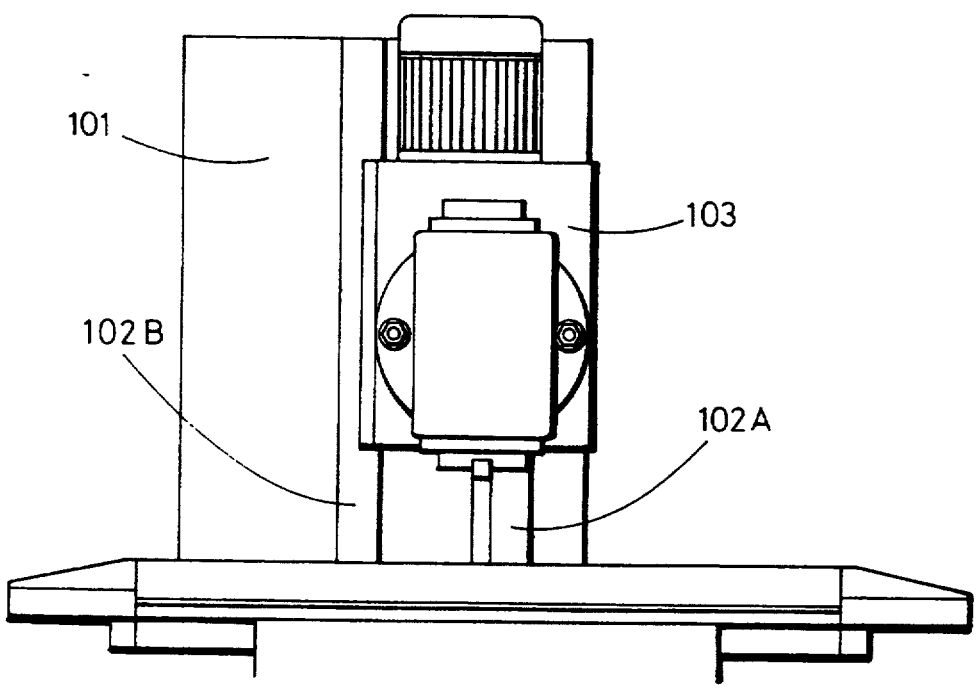

A detailed description of the present invention in the embodiment of the drawings attached is given as follows:

FIGS. 1 and 1—1 are the schematic drawings of the design of the main structure of the machine tool of the present invention providing the main shaft rail body with oblique upward and downward guide rail and the application structure, in which except the main structure of conventional machine table, working table and main shaft, the feature is to provide the structure of oblique rail body. The rail body 101 includes fixed rail body and the movable type main shaft rank body to shift forward and backward, leftward and rightward, or forward, backward, leftward and rightward, the feature is that a vertical parallel sliding rail tilting leftward or rightward rear 102A, 102B are provided on the working surface facing the rail body allowing the upward and downward shifting and sliding of the structure of the vertically sliding rail body 103 to be coupled, and the sliding surface constituted by sliding rails 102A, and 102B is the obligure surface formed between the surface facing the working piece and the lateral side. The vertical sectional profile of the rail body itself includes the shapes to be similar to square, rectangle, diamond, cylindrical or multiple surfaces or other shape which provides the above feature to have a vertical, oblique surface for the installing of the combination of the guide rail and the main shaft rail body to shift upward and downward.

Figure 2:
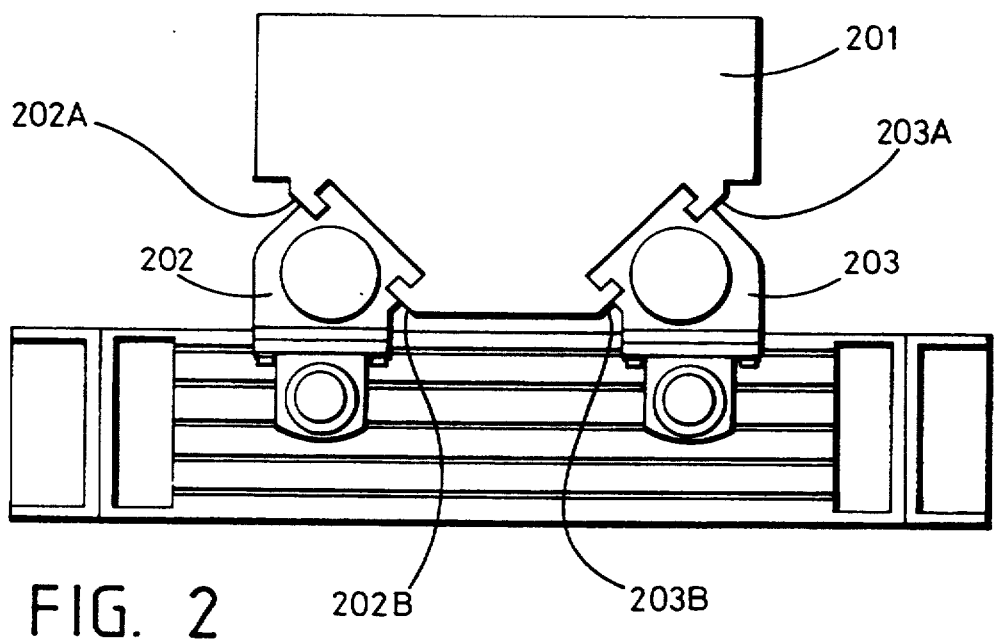
FIG. 2 is the bird's view of the machine tool in the present invention machine tool providing oblique upward and downward guide rail for the rail body of the main shaft and the application structure.

FIG. 2 is the schematic drawing of the structure of the embodiment of the machine tool of the present invention which provides the oblique upward and downward guide rail on the two sides of the main shaft rail body and the application structure, in which except the main structure of conventional machine table, working table and main shaft, the feature is to provide the structure of oblique rail body, the rail body 201 comprises fixed rail body or moveable main shaft rail body allowing to shift forward and backward, leftward and rightward, or forward, backward, leftward and rightward, the feature is that there are vertical parallel sliding rails 202A and 202B tilted towards left rear on the working surface of the rail body facing the working piece simultaneously allowing the upward and downward shifting and sliding of the structure of the vertical sliding machine table 202 to be coupled, and there is the oblique surface of the dual side oblique upward and downward guide rail formed by the right rear tilting vertical parallel sliding rails 203A and 203B and the structure of the vertical sliding machine table 203 to be coupled, the vertical sectional profile of the rail body itself presents the shape to be similar to square, rectangle, diamond, cylindrical, multiple shape, or other shape which has the above feature to provide an oblique surface for the installing of the combination of the guide rail and the machine table of the main shaft to shift upward and downward.

Figure 3:
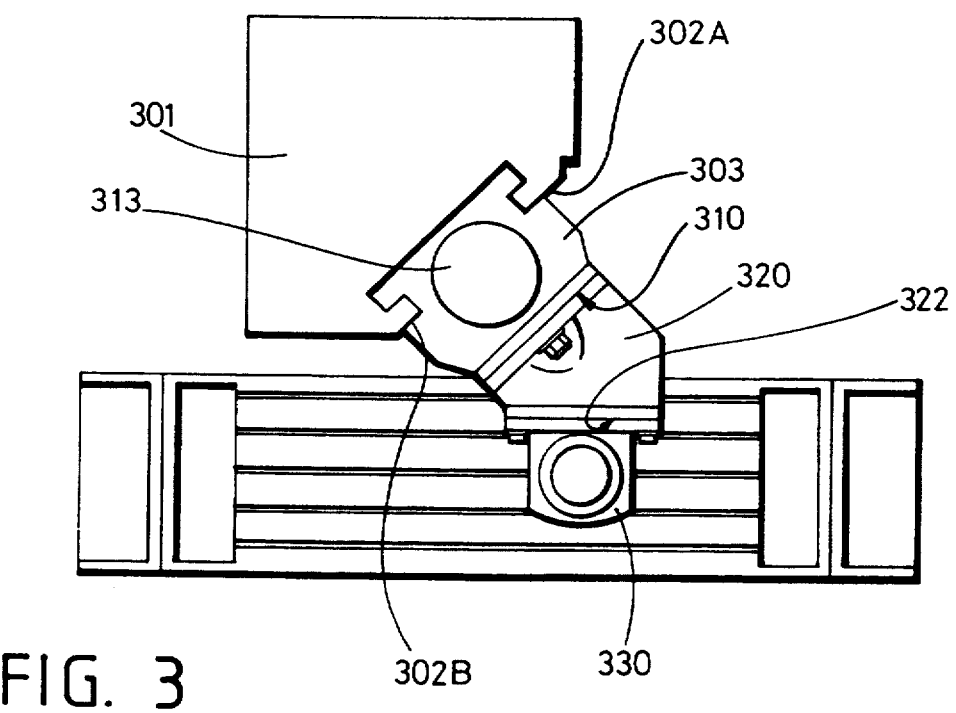
FIG. 3 is the bird's view of the machine tool in the present invention providing the rail body with upward and downward guide rail along with the first and second middle rotary sliding table as well as the main shaft structure allowing to regulate the Orientation.
Figures 1, 2, 3:
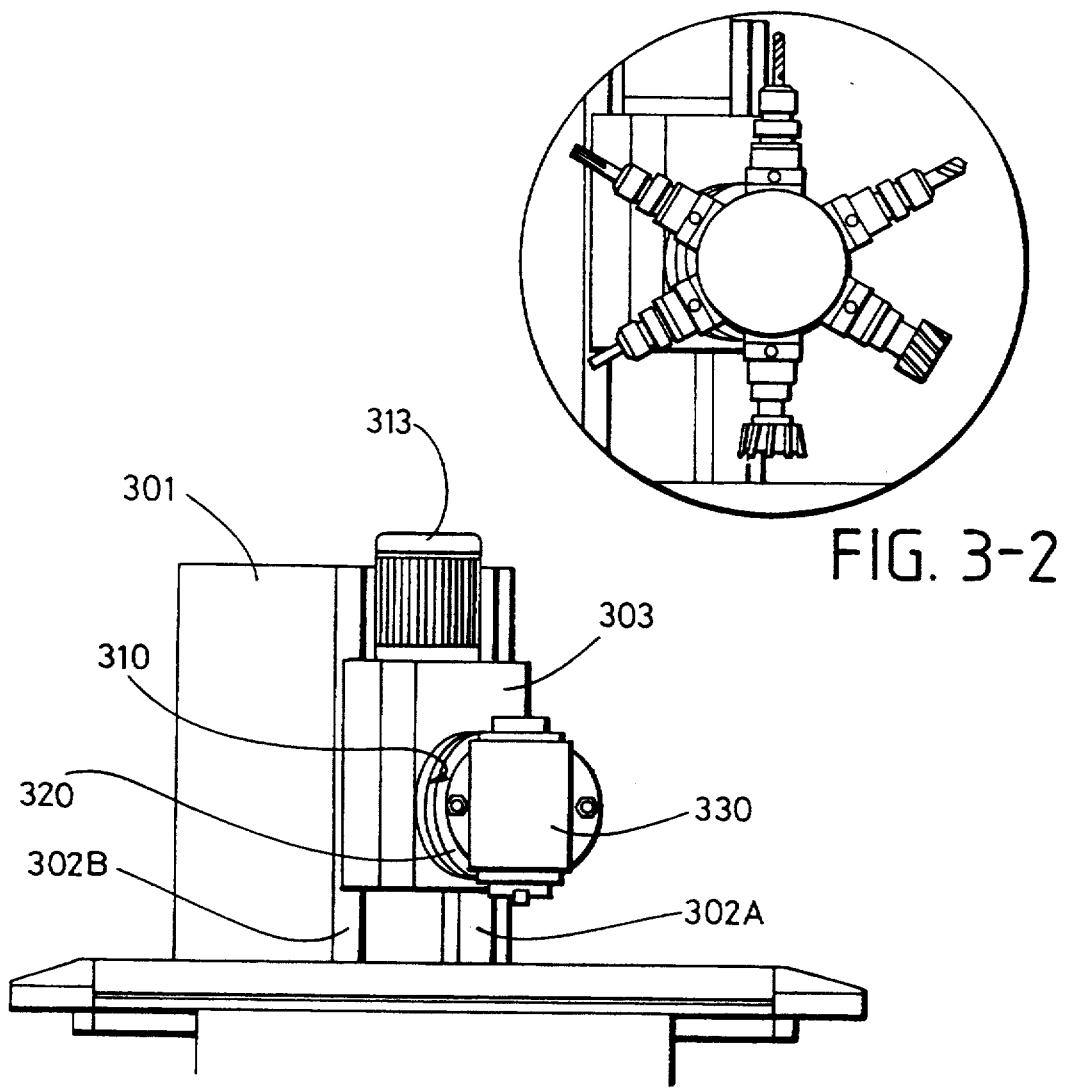
Figure 4:
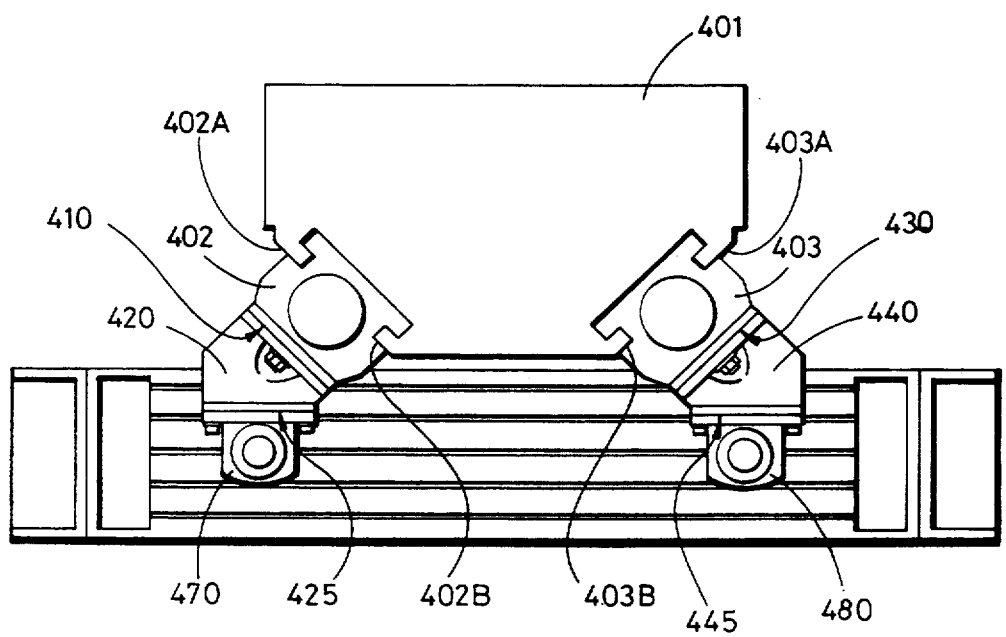
FIG. 4 is the bird's view of the machine tool in the present invention providing the rail body of the oblique upward and downward guide rail on two sides and the first and second rotary middle sliding table along with the regulation of the orientation of the main shaft.

On the basis of the above design, in addition to the benefit of the arrangement of specific oblique space, we can obtain further the multiplied function as shown in FIGS. 3 and 4 which includes:

1. The combination of the oblique sliding seat and main shaft machine table allowing rotary regulation structure to constitute the function of vertical and horizontal bi-directional and universal regulation;

2. The combination of the oblique sliding seat allowing rotary regulation structure and the rotary multiple main shafts turret main shaft machine seat allowing rotary regulation to provide the function of the main shaft with vertical and horizontal bi-directional rotary type multiple main shafts rotary tower.

The benefit of the above structure is described further as follows:

FIGS. 3 and 3-1 are the preferred embodiments of the machine tool of the present invention providing the main shaft rail body with oblique upward and downward guide rail and the application structure and vertical and horizontal bi-directional or multiple surfaces machining the structure of the main shaft constituted by the oblique first and second middle sliding seat and the main machine seat allowing rotary regulation, in which the main structure comprises.

Rail body 301: It comprises fixed rail body or movable type main shaft rail body allowing forward and backward, or leftward and rightward, or forward, backward, leftward and rightward shift, the feature is to provide the vertical parallel sliding rails 30-2A and 30-2B tilting rear leftward or rightward for the rail body on the working surface facing the working piece all wing the upward and downward shift movement of the vertical sliding machine table structure 303 to be coupled, and the sliding surface constituted by the sliding rails 302A and 302B is positioned on the oblique surface between the surface facing the working piece and the lateral surface;

Vertical sliding machine seat structure 303: It provide the surface to be coupled with guiding rails which is vertical and parallel to the rail body allowing the vertical driving of the vertical, parallel sliding rails of the rail body, on which the main shaft motor 313 is installed on it, and the other side provides the surface 310 allowing the coupling of the second machine seat 320, the coupling surface is in parallel to the oblique surface of the rail body allowing the machine seat 320 to perform 360 rotary regulation driving to be positioned and fixed on the coupling surface 310;

Main shaft machine seat 330: Allowing the installing of the related structure of the main structure, such as, main shaft, bearings, driving, thrusting, driving, and installing to form the rotary angle shift regulation surface to be parallel to the axis of the main shaft; the above structure allows the regulation of the vertical sliding machine seat structure 310 and the second middle machine seat 320, and allows the rotary angle shift regulation, positioning and fixing between the second middle machine seat 320 and the main shaft machine seat 330 to form vertical, horizontal, leftward, rightward, downward and upward machining orientation. Besides, it is also able to provide further multiple main shafts turret rotary tower structure (as shown in FIG. 3-2) to replace the main shaft machine seat 330.

In the meantime, the structure as shown in FIG. 2 is able to be designed further to provide the dual main shafts structure allowing vertical and horizontal bi-directional machining constituted by the first and second sliding seat with oblique upward and downward guiding rail on the two sides and oblique rotary regulation to form the type of the structure allowing the selection to be doubly vertical, doubly horizontal, singly vertical and singly horizontal; in preferred embodiment, we may replace further the single main shaft structure with multiple shafts turret structure to become the turret type machine tool with vertical and horizontal: dual functions.

FIG. 4 is the schematic drawing of the preferred embodiment of the above machine tool which provides the oblique upward and downward guiding rail on the two sides of the rail body and the main shaft structure allowing rotary regulation orientation, it consists mainly:

Rail body 401: It composes fixed type rail body and the moving type main shaft rail body allowing to shift forward and backward, leftward and rightward, or forward, backward, leftward and rightward, the feature is to provide vertical, parallel sliding rails 402A and 402B to tilt left rear on the working surface of the rail body facing the working piece simultaneously to facilitate the coupling of the vertical sliding machine seat structure 402 to shift or slide upward and downward and the vertical, parallel sliding rails 402A and 403B to tilt right rear and the coupling of the sliding machine seat structure to form the oblique surface which provides upward and downward guide rails on the two sides;

Left vertical sliding machine seat structure 402: It is coupled with the vertical, parallel guiding rails coupling surface of the rail body allowing the vertical, parallel sliding rails of the rail body to drive vertically, on which the main shaft motor is installed. The other side allows the coupling of the coupling surface of the second machine seat 420, this coupling surface is parallel to the oblique surface of the rail body allowing the machine seat 420 to perform 360 rotary regulation and driving, and positioning and fixing on the coupling surface 410 mechanically or manually:

Right side vertical sliding machine seat structure 403: it is to be coupled with the coupling surface of the vertical, parallel guiding rails to tilt right rear allowing the vertical driving along the vertical, parallel sliding rails 403A and 403B, on which the main shaft motor is installed.

The other side allows the coupling of the coupling surface 430 of the second machine seat 440, this coupling surface is parallel to the oblique surface of the rail body, allowing the machine seat 440 to perform 360 rotary regulation and driving, and positioning and fixing on the coupling surface mechanically or manually;

Left side main Shaft machine Seat 470: It provides the installing of the structures relating to the main shaft, such as, main shaft, bearings, conveying, thrusting, and driving, and also the rotary angle shift regulation and positioning and fixing structure to be coupled with the second coupling surface 425 of the second middle machine seat 420 on the left side to form the rotary angle shift tool rotary regulation surface to be parallel to the axis of the main shaft; the above structure is able to form vertical and horizontal, leftward, rightward, downward, and upward orientation of machining by regulating the rotary angle shift regulation between the vertical sliding machine seat structure 402 and the second middle machine seat 420, as well as the second middle machine seat 420 and the main shaft machine seat 470;

Right side main shaft machine seat 480: It provides the installing of the related structures of the main shaft, such as, main shaft, bearings, conveying, thrusting and driving, and also the structure of the rotary angle shift regulation and positioning and fixing to be coupled with the second coupling surface 445 of the second middle machine seat 440 to form the rotary angle shift tool rotary regulation surface to be parallel form the rotary angle shift tool rotary regulation surface to be parallel to the axis the main shaft; the above structure is able to form vertical, and horizontal, leftward, rightward, downward and upward orientation of machining by means of the regulation of the vertical sliding machine seat 403 and the second middle machine seat 440, as well as the second middle machine seat 440 and the main shaft machine seat 480.

Moreover, it is also able to select the rail body main shaft machine seat and the main shaft providing oblique upward and downward guiding rails on two sides to be the structure providing multiple main shaft turret or on one side, and providing the single direction main shaft structure on the other side allowing to be regulated vertically, horizontally or in universal orientation for milling and boring in order to provide more widely use.

Figure 5:
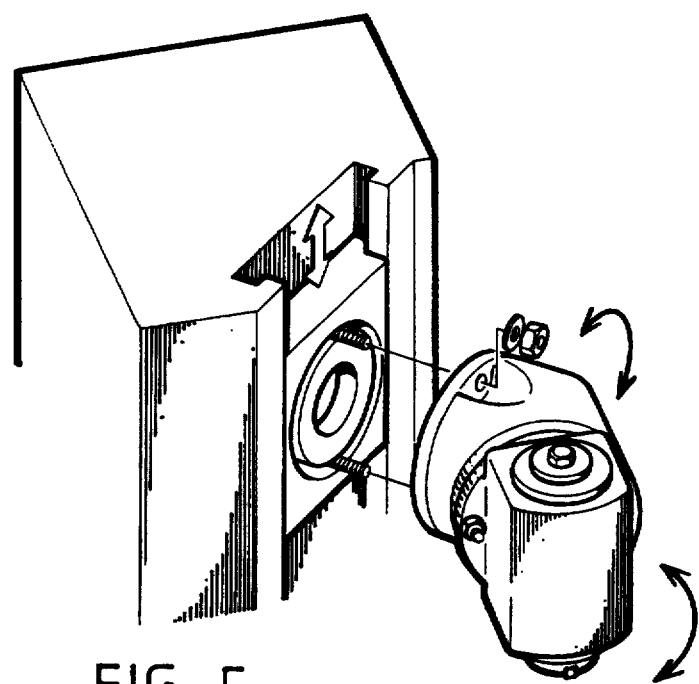
FIG. 5 is schematic solid view to constitute the state of combination of the sliding and rotation directly by the second machine table and the sliding rail.

In the embodiments of the above FIGS. 3 and 4, the following ways may be adopted for the arrangement of the peripheral components required: (1) The main shaft driving motor:except to install the main shaft motor on the main shaft machine seat or tool carrier, it is also able to be installed on the first machine seat to be conveyed to the main shaft or the tool axle on the tool carrier by means of the driving component: (2) In the case of light load, the second machine seat and the sliding rail any form the state of combination directly allowing to slide and rotate as shown in FIG. 5, the examples of the above structure of combination are soon widely in mechanical arts without the need of detailed description; (3) The way to drive upward and downward along the rail body intaudes to be constituted by conventional mechanism or flowing pressure component to receive mechanical or manual driving, or digital control further.

Therefore, by means of the above main shaft rail body with oblique upward and downward guiding rails and the application structure of the machine tool, an innovative arrangement of space is attained.

To summarize the above description, by means of the main shaft rail body with obliquely installed upward and downward guiding rails and application structure as well as universally oriented main shaft structure along with the further combination of the axle tower type main shaft head of the machine tool to provide a reasonable and effective innovative design.

I claim:
1. A machine tool having a work supporting table and comprising:
  a) a main shaft rail body having a front face located adjacent to the work supporting table and further having at least one pair of vertically extending sliding rails, the at least one pair of sliding rails located in a vertical plane extending obliquely to the front face;
  b) a first sliding machine seat slidably attached to the at least one pair of sliding rails so as to be movable in a substantially vertical direction, the first sliding machine seat having a first mounting surface extending parallel to the vertical plane of the sliding rails;
  c) a second machine seat attached to the first mounting surface so as to be rotatable with respect to the first sliding machine seat, the second machine seat having a second mounting surface located in a vertical plane extending obliquely to the vertical plane of the sliding rails; and,
  d) a main shaft machine seat attached to the second machine seat.

2. The machine tool of claim 1 wherein the main shaft machine seat comprises a turret assembly having a plurality of tools thereon.

3. The machine tool of claim 1 further comprising first and second pairs of sliding rails, each pair of sliding rails extending vertically in planes extending obliquely to the front face.

4. The machine tool of claim 3 further comprising a first sliding machine seat attached to each pair of sliding rails so as to be movable in a vertical direction, each first a sliding machine seat having a first mounting surface extending parallel to the plane of the sliding rails to which it is attached.

5. The machine tool of claim 4 further comprising a second machine seat attached to each first mounting surface so as to be rotatable with respect thereto, each second machine seat having a second mounting surface located in a plane extending obliquely to the plane of the corresponding sliding rails.

6. The machine tool of claim 5 further comprising a main shaft machine seat attached to each second surface so as to be rotatable with respect thereto.

* * * * *